Figure 1:
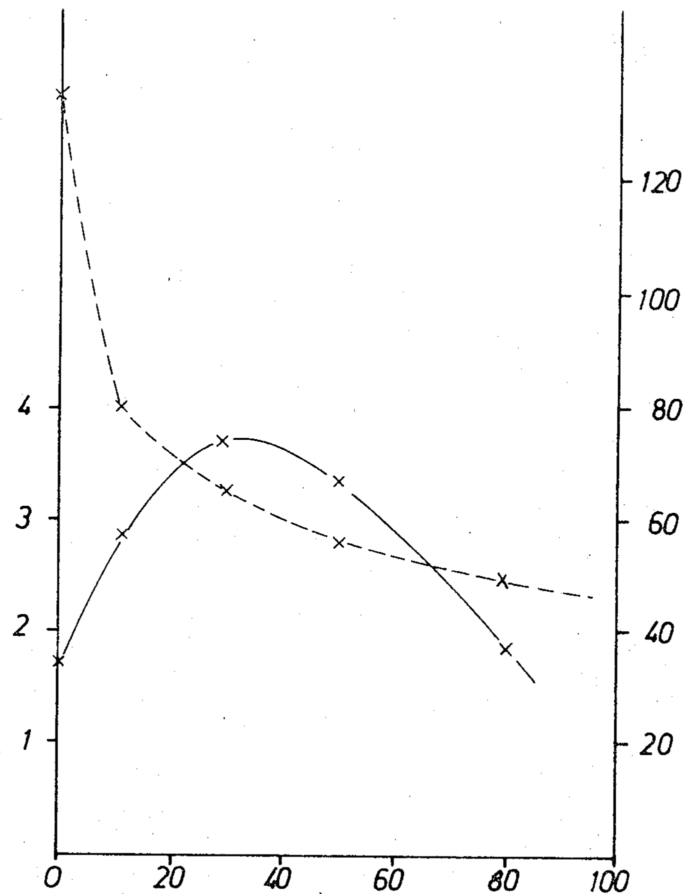

United States Patent [19]
Heinze et al.

[11] 3,773,690
[45] Nov. 20, 1973

[54] ZEOLITE ADSORBENTS

[75] Inventors: Gerhard Heinze, Schildgen; Gerhard Reiss; Friedrich Schwochow, both of Leverkusen; Gunter Ulisch, Leverkusen-Kluppersteg, all of Germany

[73] Assignee: Bayer Aktiengesellschaft, Leverkusen, Germany

[22] Filed: Mar. 23, 1971

[21] Appl. No.: 127,271

[30] Foreign Application Priority Data
Apr. 9, 1970 Germany .................. P 20 16 838.1

[52] U.S. Cl. .............. 252/455 Z, 252/451, 252/452
[51] Int. Cl. .............................................. B01j 11/40
[58] Field of Search ......................... 252/455 Z, 452; 23/111–113; 208/209

[56] References Cited
UNITED STATES PATENTS 3,366,578 1/1968 Michalko ........................ 252/455 Z
3,296,151 1/1967 Heinze et al. .................. 252/455 Z
3,058,805 10/1962 Weber ................................. 23/113

*Primary Examiner*—C. F. Dees
*Attorney*—Burgess, Dinklage & Sprung

[57] ABSTRACT

Powdered faujasite type zeolite, optionally along with powdered type A zeolite, is bonded by silica gel into granules, and the granules are treated at about 15° to 100°C with an aqueous solution containing at least about 0.7 mole of $Al_2O_3$ in the form of aluminate per mole of silica gel binder and containing sodium hydroxide in such amount that the $H_2O/Na_2O$ molar ratio is about 15 to 60, whereby the silical gel binder within each granule is converted to a type A zeolite. The product is thus a binder-free granular zeolite with type A zeolite and faujasite type zeolite distributed substantially uniformly through each granule; about 20 to 95 percent and preferably about 20 to 50 percent by weight is the type A zeolite. The product is characterized by superior adsorptivity compared with a physical mixture of powders of the two zeolites of the same overall composition.

4 Claims, 2 Drawing Figures

INVENTORS:
GERHARD HEINZE, GERHARD REISS, FRIEDRICH SCHWOCHOW, GÜNTER ULISCH.
BY Burgess, Dinklage & Sprung

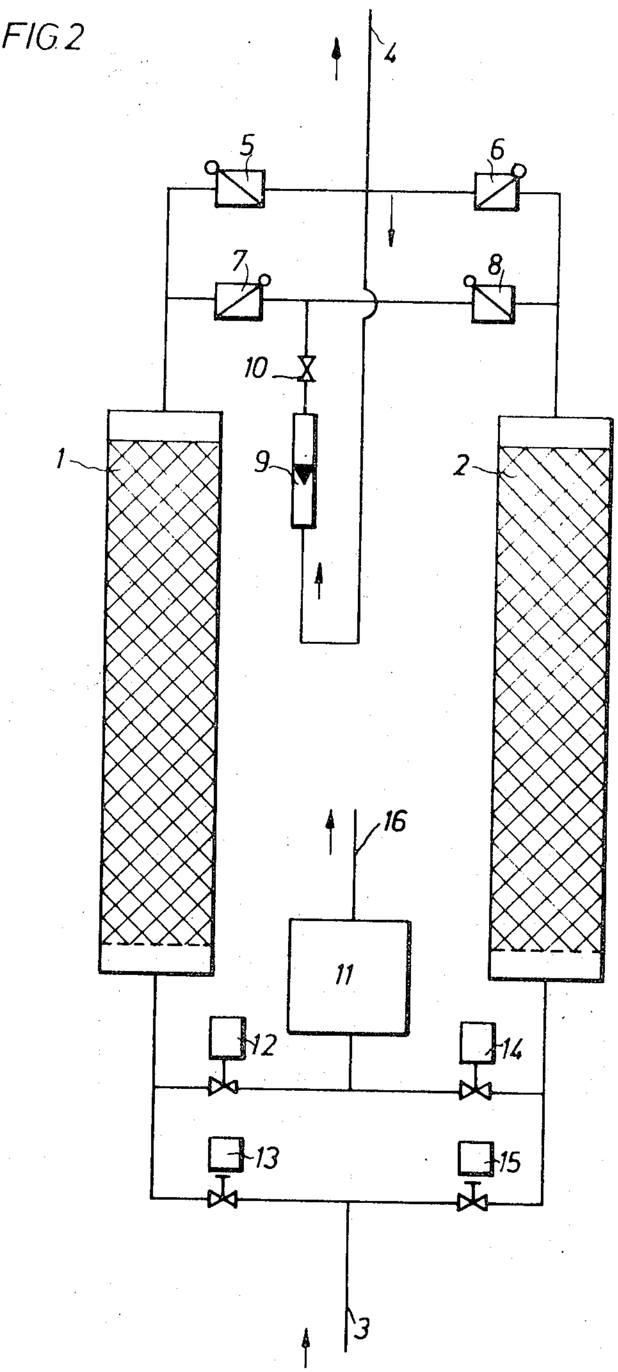
INVENTORS:
GERHARD HEINZE, GERHARD REISS, FRIEDRICH SCHWOCHOW, GUNTER ULISCH
BY: Burgess, Dinklage & Sprung

ZEOLITE ADSORBENTS

The invention relates to granulated zeolitic adsorbents which have improved adsorptive properties, a process for their preparation and their use for drying and purifying streams of fluids, i.e., gases and liquids.

For practical purposes, adsorbents are usually required to be in the form of granules or extruded particles, tablets, spheres and the like. Some adsorbents, e.g., silica gels or certain activated charcoals, are produced in granular form right from the start while others are obtained in the form of powders which are subsequently shaped by adding binders and treating them in granulating apparatus such as granulating plates, granulating drums, extruders, etc. The group of molecular sieve zeolites which in recent years have gained a place of major importance in the field of adsorption techniques are synthesised in the form of fine crystalline powders with particle sizes in the region of 0.1 to 10 $\mu$m. For processing these crystal powders into abrasion resistant granules, processes have been developed which use, as binders, e.g., clay substances such as kaolin, bentonite or attapulgite or synthetic binders such as water-glass, silicic acid sols, aluminum hydroxide, etc..

Zeolites are generally understood to be a group of crystalline hydrated aluminosilicates of monovalent or polyvalent bases which give up their water without changing their crystal structure and are capable of adsorbing other compounds in place of the water removed and which, moreover, are capable of exchanging bases (M.H. Hey, Trans. Ceram. Soc. 36 (1937), pages 84 – 97). Zeolites are characterized by their crystal structure. Among the numerous known natural and synthetic zeolites, those of the type of zeolite A, faujasite, mordenite, chabasite, erionite and clinoptilolite, are of special importance. Each of these types has its own crystal structure which gives its own characteristic X-ray diffraction diagram by the method of Debye and Scherrer. Substances which belong to one and the same zeolite lattice need not necessarily have the same chemical composition. By virtue of their nature as ion exchangers, the zeolites are capable of adsorbing a variety of different cations into their crystal lattice. Furthermore, $SiO_4$ and $AlO_4$ tetrahedrons are to a certain extent interchangeable in the anionic structural framework so that the composition of the zeolites may vary within certain limits, i.e., natural and synthetic zeolites have a certain range of phases in their chemical composition.

Zeolites of type A have completely uniform pores of diameters in the region of 3 to 5 A units, the exact value of the pore diameter depending on the nature and quantity of the cations in the crystal lattice. They are known as "narrow pore zeolites." Zeolites of the faujasite type, on the other hand, have pore diameters of about 8 to 9 A units and are known as "wide pore zeolites." Within the meaning of this invention, faujasites are understood to be zeolites of the general formula $$R_{2/n}O \cdot Al_2O_3 \cdot xSiO_2 \cdot yH_2O$$

(R = metal of valency $n$ or H, $NH_4$, $CH_3$–$NH_3$, etc.; $x$ = 2 – 6; $y$ = 0 – 8). They have the structure of the mineral faujasite whose exact structural analysis has been carried out by Bergerhoff et al., (Min. Monatsk. (1958) page 193). The term Zeolite A in the context of this invention is understood to denote zeolites of the formula

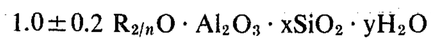

$$1.0 \pm 0.2\ R_{2/n}O \cdot Al_2O_3 \cdot xSiO_2 \cdot yH_2O$$

(R = metal of valency $n$; $x = 1.85 \pm 0.5$; y = 0 to 6) having a lattice constant of the sodium form of about 12.3 A. These may be prepared e.g. by the process described in German Patent Specifications Nos. 1, 038, 016 and 1, 038, 017. The individual pore diameters of a given zeolite are completely identical with each other due to the crystal structure. By virtue of this fact, extremely selective separation of molecules according to their size and structure can be carried out by adsorption. The best known example for this is the separation of normal hydrocarbons and isohydrocarbons by means of zeolites having a pore diameter of 5 A units; only the straight chained hydrocarbons are adsorbed by the zeolite and the branched more bulky molecules cannot enter the interior of the crystals through the zeolite pores. (The maximum powder size may reach values up to 150 mikrons). This interesting principle, however, is not made use of in the many different applications of zeolites in adsorption techniques; instead, owing to the polar structure of their internal surface, zeolites are used as adsorbents for the preferential adsorption of polar, polarizable or unsaturated compounds.

The wide pore zeolites of the faujasite type are capable, by virtue of the size of their pores, of adsorbing into their system of cavities practically any molecules which may have to be dealt with in the adsorptive purification and working up of streams of gases and liquids. The most important compounds which frequently have to be removed from streams of products by this method, e.g., $H_2O$, $CO_2$, $H_2S$, oxides of nitrogen and lower hydrocarbons, have such small molecular cross sections that they can be adsorbed by narrow pore zeolites of type A. There are, however, considerable differences in the equilibrium charges and especially the adsorption and desorption rates of these compounds which can be achieved with zeolites of the faujasite type and zeolites of Type A. On the one hand, the statistical equilibrium charges at low partial pressures are generally higher in the case of Type A zeolites whereas the wide pore zeolites have higher adsorption and desorption rates; in practice, an adsorber manifests this in terms of a short mass transition zone and a steep gradient of the break-through curve. In view of this, the last mentioned adsorbents may in certain cases be more advantageous in dynamic use in spite of their lower equilibrium capacity.

In certain special cases in practice, two or more adsorbents with different characteristics may be arranged in one and the same adsorber, either in separate layers or in the form of a mixed bed consisting of a mechanical mixture of granules of the different types.

It has also been proposed to mix pulverulent narrow pore zeolites with pulverulent wide pore adsorbents and binders and work them up together into a granulate. These granulates are used mainly for the simultaneous adsorption of water vapor and solvent vapors from the air.

For the preparation of zeolite granules, it is normally necessary to add 15 to 20 percent by weight, based on the weight of activated granules, of inert binders which do not contribute to the adsorption capacity. Since it is invariably desirable to achieve as high an adsorption capacity as possible, processes have been worked out which enable uniform particles to be produced which consist of only one particular zeolite. These processes are based on the principle of first working up the starting materials which are suitable for the synthesis of zeolites into granules and then allowing the raw materials to crystallize into zeolites only when they are already within the granules. In another process, the crystalline zeolite powder obtained on synthesis, e.g., zeolite A powder, is worked up into granules with a binder, and the binder is then converted into the same type of zeolite in these granules, the zeolite crystals originally incorporated in the granules acting as nuclei. In the same way, faujasite granules already containing binder have been converted into particles consisting only of faujasite.

It is an object of the present invention to produce granules containing both a faujasite type zeolite and a type A zeolite free of binder.

It is another object of the invention to provide a zeolite adsorbent of superior performance in purifying fluids.

These and other objects and advantages are realized in accordance with the present invention wherein there are provided granular, abrasion resistant molecular sieve zeolites which are free from binder, and containing both zeolite of the faujasite type and zeolite of Type A in very fine distribution. The new type of zeolite granules are eminently suitable for purifying and drying streams of gases and liquids.

The process of preparation is characterized in that pulverulent zeolites of the faujasite type, optionally together with pulverulent type A zeolites, are worked up into granules which are bound with silica gel, and the $SiO_2$ binder in these granules is subsequently converted into zeolite A by treating it at temperatures of 50 °C to 100 °C with an aqueous solution which contains, for each mole of $SiO_2$ binder, at least about 0.7 mole of $Al_2O_3$ in the form of aluminate and an amount of sodium hydroxide such that the $H_2O/Na_2O$ ratio, expressed in moles, is about 15 to 60.

To carry out the process according to the invention, granules which contain binder are first prepared; in addition to the $SiO_2$ binder, these granules contain either zeolite crystals of the faujasite type alone or a mechanical mixture of faujasite and zeolite A crystals, according to whether the quantity of zeolite A additionally formed from the $SiO_2$ binder in the course of the process is sufficient for the purpose envisaged or whether a higher zeolite A content is required in the end product.

Various processes may be used for converting the pulverulent zeolite crystals into granules which are bonded with silica gel. For example, the zeolites may be worked up into a paste with silicic acid esters and made up into granules, the esters being thereafter hydrolyzed to silicic acid. According to another process, the binder used is an aqueous sodium silicate solution which in addition contains an acid amide, in particular urea, or an acid chloride, a nitrile, an ester or a mixture of such compounds. The solution of binder is mixed with the pulverulent zeolite, the mixture is worked up in extruders and the granules are then dried at temperatures of 60°C to 300°C. According to another process, the pulverulent zeolite is made up into a paste with stable, aqueous silicic acid sol and the mixture is passed through an extruder. Preferably, however, granules are produced in the form of beads bonded with silica gel by the process according to German Patent Specification No. 1, 165, 252. In this process, pulverulent molecular sieve zeolites are stirred up with aqueous, stable silicic acid sol to form a fluid suspension, the suspension is distributed in a liquid which is immiscible with water after the addition of a gelling catalyst to produce droplets of the required size, and the bead granules obtained as a result of the sol-gel conversion are finally removed from the liquid, dried and activated. Stable silicic acid sols having an $SiO_2$ content of at least about 10 percent by weight and specific surface areas of about 150 to 400 $m^2/g$ according to BET were used. Suitable gelling catalysts are e.g., finely divided MgO suspended in water. Finely divided MgO may be obtained, for example, by carefully calcining basic magnesium carbonate. The granule size may be within the range of 0.5 mm to 5.0 mm.

We have now found that a treatment with aqueous solutions of sodium hydroxide and sodium aluminate may convert the $Si0_2$ binders in the granules which contain either faujasite crystals alone or a mixture of faujasite and zeolite A crystals either into faujasite crystals or into zeolite A crystals according to the reaction conditions. We have also surprisingly found that much harder granules are obtained if the formation of zeolite from the $Si0_2$ binder is steered in the direction of zeolite A. Faujasite granules bonded with faujasite are soft in contrast to the extremely hard and abrasion resistant faujasite granules bonded with zeolite A. No theoretical explanation for this phenomenon can be given at the present time but it is supposed that the much higher rate of growth of zeolite A crystals compared with the rate of crystallization of faujasite is responsible for a firm bond being formed between the crystals originally present in the granules before a loosening of the bond occurs due to substantial dissolution of the non-crystalline components.

It is surprising that the faujasite crystals present in the granules are not destroyed and converted into zeolite A under the reaction conditons of zeolite A formation. All that could be observed was that a faujasite having a given $SiO_2$ content was converted in the course of the treatment of the granules into a faujasite of slightly lower $SiO_2$ content due to removal of $SiO_2$, although this only took place within narrow limits. This is shown in the Debye Scherrer photographs by a slight increase in the lattice constants. Solutions which contain at least about 0.7 mole of $Al_2O$ in the form of aluminate for each mole of $SiO_2$ binder are used for the conversion of the binder into Zeolite A. The quantities of aluminate used are advantageously within the range of about 0.7 to 2.0 moles. A larger amount of $Al_2O_3$ is not harmful but for economical considerations would hardly be used. The $H_2O/Na_2O$ ratio in the solution should be about 15 to 60, expressed in moles. Ratios lower than 50 favor the formation of unwanted by-products whereas ratios higher than 60 result in unnecessarily long reaction times.

Since the conversion is a reaction in a heterogeneous system between a solid and a solution, the quantity of reaction solution used is not in itself critical, provided only that the necessary minimum quantity of $Al_2O_3$ indicated above is present. The reaction solution should, of course, sufficiently cover the granules. The solution is advantageously circulated by pumping through a layer of granules arranged in a container with perforated bottom, and uniform temperature control over the cross-section of the container can also easily be achieved by means of a heat exchanger installed in the pump circuit.

It is advantageous, especially in the case of granules of large diameter, e.g., in the region of 3 to 6 mm, to leave the reaction solution to act on the granules for several hours at ambient temperature at first in order to enable the aluminate ions to traverse the long path of diffusion to the core of the granules before crystallization of zeolite A sets in in the marginal zone. Three to 5 hours are sufficient for this purpose but longer times are not harmful. The reaction mixture is then heated to temperatures of about 50°C to 80°C in order to accelerate the crystallization process. The minimum crystallization time required in any particular case at certain temperatures and compositions of reaction solutions and granules can be determined approximately by means of adsorption measurements on the products obtained, e.g., by determining their $H_2O$ adsorption capacity; it is not harmful to continue crystallization for several hours longer than the time required.

When reaction is completed, the granules are washed with water which must be renewed several times. This takes several hours owing to the repeated diffusion of alkaline solution from the interior of the granules. The granules are then dried and activated in known manner, e.g., in a current of hot air.

The granules prepared according to the invention, which are free from binder, have the following important advantages over known granules: Faujasite granules, even those which have been prepared with the addition of mineral clays as binders, are comparatively soft. The granules prepared by the new process, especially those in the form of beads, are by contrast distinguished by their excellent break resistance, abrasion resistance and elasticity. Another advantage is the increase in bulk density obtained by the reaction according to the invention due to the fact that faujasite granules generally have lower bulk densities than zeolite A granules. This is connected with the fact that the crystals obtained from the synthesis of faujasite are much smaller than the crystals obtained from zeolite A syntheses which cannot be compressed to such an extent when the material is worked up into granules.

The break resistance of the granules prepared by the process according to the invention is generally between about 2 and 8 kg and the bulk density between about 600 and 750 g/l.

The new process can be used for preparing a wide range of granules differing in their composition as regards the zeolite A content and faujasite content according to the purpose for which they are to be used. If one starts with faujasite crystals and works these up into granules bonded with $SiO_2$ which are then reacted with aluminate solution, the resulting granules contain between about 10 and 30 percent of zeolite A according to the amount of $SiO_2$ binder used, the remainder consisting of faujasite. Conversely, by working up mixtures of zeolite powders containing e.g, 10 percent of faujasite and 90 percent of zeolite A, end products which contain over 90 percent of zeolite A can be produced, the remainder consisting of faujasite. Surprisingly, even low contents of faujasite homogeneously distributed and embedded in zeolite A result in a less dense structure of the granules owing to the relative fineness of the faujasite crystals, so that uniformly porous particles having a relatively low resistance to diffusion are obtained. This fact is extremely significant for adsorption techniques owing to the advantageous dynamic behavior of such granules, especially the formation of shorter mass transfer zones.

Generally, granules having a zeolite A content of about 20 to 95 percent by weight and a faujasite content of 5 to 80 percent by weight are prepared. Granules which contain about 80 to 50 percent by weight of zeolite A and about 20 to 50 percent by weight of faujasite are very advantageous.

It has been found that the granules according to the invention, which contain both zeolite A and faujasite distributed completely homogenously, have important advantages over the single component granules for numerous applications in adsorption techniques. Furthermore, the granules according to the invention are distinguished by the fact that they are completely free from inert, non-zeolitic binders which diminish the adsorption capacity and may in some circumstances even bring forth unwanted catalytic side effects. Lastly, it is important to mention that for purposes for which pure faujasite granules have hitherto been necessary, the granules according to the invention provide not only a technical improvement but also an economic advantage because in contrast to the pure faujasite granules they require only a certain proportion of the relatively expensive faujasite zeolite for their preparation.

The granules were tested for the purification of air in air separation plants. For this purpose, water vapor and carbon dioxide together with any traces of hydrocarbons present are simultaneously adsorbed on molecular sieve zeolites at the ambient temperature. The processes commonly used in the past for air separation, consisting of adsorption of water vapor on silica gel at the ambient temperature and of $CO_2$ on silica gel in separate adsorbers at low temperature and the removal of $CO_2$ by scrubbing with sodium hydroxide solution are being increasingly replaced by the above mentioned process of single stage adsorption on molecular sieve zeolites. For this purpose, zeolites of the type Na-A, Ca-A and Na-faujasite (e.g., the synthetic type 13 X) are nowadays used in practice, according to the particular operating conditions of the plant.

Whereas drying is equally successful with all the types mentioned, the individual types differ as regards removal of $CO_2$. The following Table 1 shows for the different zeolites the equilibrium charges of $CO_2$ in the range of $CO_2$ partial pressures and temperatures commonly used in the technical process.

The table shows the values for the following types: Sodium zeolite A, free from binder, pore size 4 A Calcium zeolite A, free from binder, pore size 5 A Sodium faujasite containing binder, pre size 9 A (Trade product "Zeolite 13 X" of Union Carbide Corporation, New York).

TABLE 1

[$CO_2$ charges in g. of $CO_2$/100 g. of anhydrous zeolite]

| $CO_2$ partial pressure (mm. Hg) | Charges at 25° C. of— | | | | Charges at 40° C. of— | | | |
|---|---|---|---|---|---|---|---|---|
| | 1 | 5 | 10 | 50 | 1 | 5 | 10 | 50 |
| Na zeolite A | 4.3 | 7.4 | 8.7 | 12.0 | 2.2 | 4.7 | 6.3 | 10.3 |
| Ca zeolite A | 3.4 | 6.6 | 9.0 | 15.6 | 1.7 | 4.3 | 6.1 | 13.5 |
| Na faujasite | 2.2 | 4.3 | 6.0 | 10.8 | 1.2 | 2.9 | 4.2 | 8.0 |

The figures in Table 1 show that the $CO_2$ charges at the lowest partial pressures are higher on sodium zeolite A than on sodium faujasite, calcium zeolite A being intermediate. The differences become even greater when the figures are based not on the weight but on the volume since faujasite granules have lower bulk densities. In the region of higher partial pressures, the relative differences become smaller and calcium zeolite A even exceeds sodium zeolite A in the charge adsorbed at higher partial pressures. In spite of the low equilibrium charges of sodium faujasite, this type is widely used in this field of application because it adsorbs more rapidly owing to its larger pores and therefore provides much shorter mass transfer zones. This may, in some cases, result in higher dynamic charges in spite of the lower equilibrium charge.

To carry out the test, dry air having a $CO_2$ content of 370 ppm (volume) was passed at 6.4 atmospheres at +23°C through a zeolite column having an internal diameter of 21 mm and a height of bed of 1,500 mm. The rate of flow, referenced to the empty column, was 24 cm/sec. The zeolites used were beads measuring 1.4 to 3.6 mm which were activated with absolutely dry air (dew point below −70°C) at 300°C before the test.

To evaluate the tests, the quantity of purified air was measured with a gas meter behind the zeolite column. The average $CO_2$ charge of the zeolite, the "breakthrough charge," which is the important value to determine for technical adsorbents, can be calculated from the quantity of air purified before the breakthrough of 1 ppm (volume) of $CO_2$. The length of the mass transfer zone (MTZ) could be determined by means of a number of gas analysis tubes distributed over the length of the column. The results of these tests are shown in Table 2 and represented graphically in FIG. 1.

TABLE 2

| Test No. | Zeolite sample | Quantity, g. | Sodium faujasite content in per-cent by weight | Breakthrough charge, g. of $CO_2$/100 g. of zeolite | Length of MTZ, cm. |
|---|---|---|---|---|---|
| 1 | Na-zeolite A | 372 | | 1.70 | 135 |
| 2 | I | 347 | 10 | 2.85 | 80 |
| 3 | II | 357 | 30 | 3.70 | 70 |
| 4 | III | 367 | 50 | 3.35 | 55 |
| 5 | IV | 347 | 80 | 1.85 | 50 |

In Table 2, "sodium zeolite A" denotes granules of sodium zeolite A in the form of beads which are free from binder. Zeolite samples I, II, III and IV are zeolite granules free from binder obtained by the process according to the invention, the preparation of which is described in Examples 4*a*, 4*c*, 4 *d* and 2, respectively.

The invention will be described more fully hereinbelow with reference to the accompanying drawings wherein:

FIG. 1 is a graph plotting each of the mass transfer zone length and the breakthrough for a $CO_2$ adsorption against the composition of granules comprising type A zeolite and faujasite type zeolite in accordance with the invention; and FIG. 2 is a schematic view of a preferred embodiment of the use of the novel adsorbents for treating fluids continuously.

Referring now more particularly to FIG. 1, the breakthrough charge in g/100 g (on the left side) and the length of the MTZ in cm (on the right side) are entered along the ordinate line and the sodium faujasite content in per cent by weight is entered along the abscissa line (the broken line indicates the length of MTZ, the solid line the breakthrough charge). Table 2 and FIG. 1 show that optimum breakthrough charges are obtained with granules having a sodium faujasite content in the range of about 20 to 50 per cent by weight. Within this range, the lower equilibrium capacity of the faujasite component is more than compensated for by the shorter MTZ. At still higher faujasite contents, however, there is hardly any increase in the MTZ length.

Test 3 in Table 2 was repeated but with the difference that instead of 357 g of the homogenous granules according to the invention which contained 70 percent of sodium zeolite A and 30 percent of sodium faujasite, a mixture of 257 g of sodium zeolite A granules and 105 g of sodium faujasite granules was used (Test No. 3*a*). The results of the two tests are set side by side in Table 3 below. It is quite clear that a much higher breakthrough charge is achieved with the homogeneous granules according to the invention than with a mixed bed consisting of practically the same amounts by weight of the two types. This is presumably mainly due to the fact that when granules of a more rapidly adsorbing type of zeolite are mixed in with an adsorber, the long mass transfer zone of the more slowly adsorbing type which is present in excess is not significantly reduced whereas if the two types are homogeneously distributed within the individual granules, the advantageous effect of drastic shortening of the mass transfer zone is obtained.

TABLE 3

| Test No. | Zeolite sample | Quantity, g. | Composition percent by by weight | Breakthrough charge, g. $CO_2$/100 g. zeolite | Length of MTZ, cm. |
|---|---|---|---|---|---|
| 3 | II | 357 | 30% faujasite plus 70% zeolite A. | 3.7 | 70 |
| 3a | Na-zeolite A. | 257 | 100% zeolite A | 1.4 | 130 |
| | Na plus faujasite Mixed bed. | 105 | 100% faujasite | | |

A test was then carried out with the granules which had been converted into the calcium form by exchange according to Example 5, and the results are set against those obtained with a pure 5 A zeolite in Table 4. In Table 4, "Ca-zeolite A" denotes a granulate free from binder in the form of beads of Ca-zeolite A (approximately 60 percent ion exchange ). Sample V is the Ca exchanged zeolite granulate according to the invention from Example 5.

TABLE 4

| Test No. | Zeolite sample | Quantity, g. | Ca-faujasite content, percent by weight | Breakthrough charge, g. $CO_2$/100 g. zeolite | Length of MTZ, cm. |
|---|---|---|---|---|---|
| 6 | Ca-zeolite A | 377 | | 1.95 | 75 |
| 7 | V | 360 | 25 | 3.00 | 32 |

Here again, the zeolite according to the invention which contains Ca-zeolite A and Ca-faujasite homogeneously distributed is superior to pure Ca-zeolite A. The breakthrough charges obtained, however, are not so high taken as a whole because Ca-zeolite A is superior to Na-zeolite A in its equilibrium charge only at higher pressures or $CO_2$ partial pressures.

Another field of application for the zeolites according to the invention, which is in principle analogous to the removal of $CO_2$ from air before air separation plants, is the sweetening of hydrocarbons. Hydrogen sulphide, which is the main impurity, would already be adsorbed by Na-zeolite A like $CO_2$ in the purification of air, but the exclusive use of sodium zeolite A or calcium zeolite A results in excessively long mass transfer zones. The zeolites according to the invention enable the removal of $H_2S$ and organic sulphur compounds to be achieved with short mass transfer zones and therefore result in relatively high breakthrough charges.

The high adsorption and desorption rates of the granulates according to the invention make them especially suitable for use in plants operating by the pressure change process also known as the "cold regenerating process," "heatless drier principle" or "pressure swing process." In this process, desorption is achieved not by heating the adsorbent but simply by lowering the pressure and at the same time washing with a portion of the purified gas against the direction of charging. Plants working on this principle are characterized by short cycles of the order of a few minutes and are used e.g., for the production of dry protective gas free from $CO_2$ from combustion gases. The charge pressure may be atmospheric pressure or excess pressure and the desorption pressure is generally in the range of about 50 to 200 mm Hg but in the case of excess pressure plants it may also be atmospheric pressure.

Various zeolite granulates were compared for their efficiency in a laboratory plant of this type shown in FIG. 2. This plant consists of two adsorbers 1 and 2 which are connected alternately for adsorption and regeneration. Switching over from one to the other is effected by a time relay which controls the magnetic valves 12, 13, 14 and 15. 5, 6, 7 and 8 are non-return valves which do not need to be contolled. During the period of regeneration, the molecules which were previously adsorbed are removed from the column by evacuation with the vacuum pump 11 and simultaneous washing with a partial stream of the purified gas. The reference numeral 9 indicates a flow meter and 10 a control valve for the stream of washing gas. The amount of residual $CO_2$ in the purified gas is a measure of the efficiency of the zeolites. This amount should be as low as possible. The two adsorption columns 1 and 2 have an internal diameter of 26 mm and a height of bed of 1,000 mm, the volume of bed being 530 ml. A first switching operation opens the magnetic valves 13 and 14 and closes the magnetic valves 12 and 15. With the valves in this position, moist crude gas which contains $CO_2$ flows into the apparatus through the pipe 3 at a slight excess pressure sufficient to overcome the flow resistance, and passing through the magnetic valve 13 it enters the adsorber 1 which is filled with zeolite, where it is freed from $CO_2$ and water vapor . The purified gas leaves the apparatus through the non-return valve 5 and pipe 4 and is continuously analyzed for its residual $CO_2$ content by means of an infra-red analysis recording instrument. During this time, the adsorber 2 is being regenerated. For this purpose, a partial stream of the purified gas, controlled by the flow meter 9 and control valve 10, is sucked through the adsorber 2 at reduced pressure via the non-return valve 8 in the opposite direction to that of adsorption. The vacuum pump 11 removes the washing gas together with the desorbate through the open valve 14 and expels the gas which has been enriched with $CO_2$ and water vapor into the atmosphere through the pipe 16.

Before the adsorber 1 is fully charged, the magnetic valves 13 and 14 are closed and the magnetic valves 15 and 12 opened. During the second switching phase which now begins, the adsorber 2 is charged and adsorber 1 is regenerated. The two phases alternate in a short cycle which lasts only a few minutes.

During the test, each switching phase was adjusted to 4 minutes, i.e., the total cycle lasted 8 minutes. The vacuum pump used was a rotary vane pump having a suction capacity of 1,100 l/h. The crude gas was obtained by mixing $CO_2$ (from a steel cylinder) and air which had been saturated with water at +20°C, using gas dosing pumps. In the test series (a), the crude gas consisted of 32 Nl/h $CO_2$ and 180 Nl/h moist air, corresponding to a $CO_2$ content in the crude gas of 15.1 volumes per cent. In the test series (b), 32 Nl/h $CO_2$ were mixed with 270 Nl/h of moist air. The $CO_2$ content of the crude gas was in this case only 10.6 percent by volume but the amount of gas which had to be passed through the apparatus to be purified was much higher for a given quantity of $CO_2$. The quantity of gas used for washing was adjusted to 25 Nl/h in all the tests.

All the tests were continued until the $CO_2$ meter showed constant deflections. Table 5 below shows the minimum and maximum values of these deflections occurring within a cycle. All the zeolite granulates tested were in the form of beads of 2 to 4 mm. The highest purities of gas were achieved with the zeolite granulate according to the invention.

TABLE 5

| Test No. | Zeolite type used | Quantity, g. | Crude gas: $CO_2$, Nl/h | Crude gas: Moist air, Nl/h | Washing gas, Nl/h | Pure gas residual $CO_2$ content, p.p.m. (vol.) |
|---|---|---|---|---|---|---|
| 8a | Zeolite free from binder according to Example 2. | 338 | 32 | 180 | 25 | 2–3 |
| 8b | 80% of Na-faujasite, 20% of zeolite A. | ---------- | 32 | 270 | 25 | 24–52 |
| 9a | Sodium zeolite X containing 16% of $SiO^2$ binder. | 326 | 32 | 180 | 25 | 10–20 |
| 9b | | | 32 | 270 | 25 | 30–90 |
| 10a | Calcium zeolite A (60% calcium exchange) containing 15% $SiO_2$ binder. | 358 | 32 | 180 | 25 | 34–74 |
| 10b | | | 32 | 270 | 25 | 350–840 |

The process according to the invention will now be explained more fully in the following illustrative Examples.

EXAMPLE 1

Pulverulent zeolite of the sodium-faujasite type having the composition $0.8\ Na_2O \cdot Al_2O_3 \cdot 3 \cdot 3\ SiO_2$ and having a water content of 28.2 g of $H_2O$/100 g of anhydrous zeolite was compressed into lumps by means of a roller press.

Suspension I

Separate batches each of 105 kg of compressed zeolite were stirred into a mixture of 48 l of silicic acid sol and 450 ml of 5N-hydrochloric acid. The silicic acid sol had a density of 1.20 g/ml, and $SiO_2$ content of 30 percent by weight and a specific surface area of the $SiO_2$ particles of 200 $m^2/g$ according to BET. The finished mixture had a pH of 8.4 and a density of 1.45 g/ml.

Suspension II 30 kg of finely divided magnesium oxide sold under the trade name of "Magnesia usta extra leicht" were suspended in 500 l of water. The suspension was left to stand for at least one hour before use.

Employing the process according to German Patent Specification No. 1, 165, 562, about 60 l/h of suspension I and about 8 l/h of suspension II were fed into a mixing apparatus by means of dosing pumps, and the mixed suspensions were distributed in the form of droplets in an organic liquid. The organic liquid consisted of a mixture of perchloroethylene and o-dichlorobenzene and had a density of 1.395 g/ml. The droplets of suspension, solidified into spheres bonded with gel, sank to the bottom of the organic liquid. They were removed by means of a sieve apparatus and dried in a stream of warm air at 40°C.

The resulting granules contained 17.4 percent by weight of $SiO_2$ binder and the remainder consisted of sodium faujasite.

blow-dried with warm air and activated with a stream of hot air. According to X-ray analysis, the granules contained about 75 to 80 percent of sodium faujasite in addition to sodium zeolite A. They had a bulk density of 680 g/l and a break resistance of 5.5 kg.

EXAMPLE 3

Mixtures of sodium zeolite A were worked up into granulates of beads bonded with silica gel by the process according to German Patent Specification No. 1, 165, 562 as in Example 1. The following were used as starting materials for the preparation of the suspension of zeolite and silica sol (Suspension I) which were capable of being granulated:

I. Pulverulent sodium faujasite of the composition $0.8\ Na_2O \cdot Al_2O_3 \cdot 3 \cdot 3\ SiO_2$ having a water content of 38.9 g per 100 g of anhydrous zeolite. The crystal powder was compressed to lumps on a roller press before use.

II. Pulverulent sodium zeolite A of the composition $0.78\ Na_2O \cdot Al_2O_3 \cdot 2 \cdot 05\ SiO_2$ having a water content of 37·0 g of $H_2O$ per 100 g of anhydrous zeolite. The crystal powder was not compressed.

III. 30 percent silicic acid sol as in Example 1.

IV. 5N hydrochloric acid

V. water

Table 6 below shows the quantities used for the preparation of the suspensions of zeolite and silica sol and the composition of the resulting granulates of beads bonded with silca gel.

TABLE 6

| Example | Starting materials for the preparation of suspensions of zeolite and silicic acid sol | | | | | Composition of the granulates, percent | | | |
|---|---|---|---|---|---|---|---|---|---|
| | Zeolite A, g. | Faujasite, g. | Silica sol, ml. | HCL, ml. | $H_2O$, ml. | Zeolite A | Faujasite | $SiO_2$ binder | Ratio, zeolite A: faujasite |
| 3a | 9,320 | 1,670 | 4,530 | 26 | 0 | 70.6 | 12.5 | 16.9 | 85:15 |
| 3b | 3,840 | 1,670 | 2,270 | 8 | 10 | 58.1 | 24.9 | 16.9 | 70:30 |
| 3c | 3,290 | 2,220 | 2,270 | 0 | 70 | 49.8 | 33.2 | 17.0 | 60:40 |
| 3d | 1,645 | 3,890 | 2,270 | 8 | 0 | 24.9 | 58.1 | 17.0 | 30:70 |

EXAMPLE 2

480 kg of the air dried silica-bonded faujastie bead granulate prepared in Example 1, which had a water content of 22 percent by weight based on the aqueous granulate of particle size 1.4 to 3.6 mm, were introduced into a rubber lined container with a perforated bottom. An aqueous alkaline solution of sodium aluminate was circulated through the layer of granules by pumping. The aluminate solution was prepared by dissolving 244 kg of hydrate of alumina (containing 65 percent of $Al_2O_3$) in 447 l of 45 percent sodium hydroxide solution (density 1.48) at boiling point and diluting the resulting concentrated, clear solution with 3,307 l of $H_2O$. The treatment with aluminate was at first carried out at the ambient temperature overnight (19 hours). The circulating aluminate solution was then heated to 45°C by means of a heat-exchanger installed in the sodium hydroxide cycle and it was circulated for 5 hours. The temperature was then kept at 80°C for 3 hours.

The resulting granules of completely crystalline mixed zeolite were washed with water which was free from calcium until the wash water discharged from the granules had a pH of 8 to 9. The granules were then

EXAMPLE 4

The granulates of beads bonded with $SiO_2$ prepared in Example 3 from pulverulent mixtures of zeolite A and faujasite (*3a* to *3d*) were all treated with aluminate solution under the same conditions. This solution was prepared by decomposing 314 g of alumina hydrate (65% $Al_2O_3$) in 400 ml of 45% NaOH (density 1.48) at boiling temperature and diluting the resulting clear solution to 1 liter ($Na_2O/Al_2O_3 = 1.7$; density 1.36). 1.2 kg of air dried granulate (22% by weight $H_2O$) were in each case treated with 2.5 l of the above-mentioned circulating aluminate solution at the ambient temperature for 24 hours in a glass column in which a perforated bottom had been inserted. The solution was then diluted with 5.4 l of $H_2O$ and the layer of granulate was heated to 85°C with a heating coil for 24 hours. The completely crystallized granulates of mixed zeolite were washed with distilled water until the pH of the wash water was 8 to 9 and they were then dried and activated.

Table 7 below shows the change in the ratio of zeolite to faujasite resulting from the aluminate treatment described in this Example.

TABLE 7

| Granulate containing binder | | Granulate treated with aluminate and free from binder | | |
|---|---|---|---|---|
| Example | Zeolite A:faujasite (given) | Example | Zeolite A:faujasite [1] | Bulk density (g./l.) |
| 3a | 85:15 | 4a | 90:10 | 680 |
| 3b | 70:30 | 4b | 75:25 | 705 |
| 3c | 60:40 | 4c | 70:30 | 700 |
| 3d | 30:70 | 4d | 50:50 | 720 |

[1] According to X-ray analysis.

EXAMPLE 5

The mixed zeolite granulate free from binder obtained in Example 4*b* was converted into the calcium form by treating 1.2 kg of the air dried beads with 2.5 l of a 1.2 molar $CaCl_2$ solution in a glass column. Calcium exchange was carried out three times, each time for one hour at 50°C, the $CaCl_2$ solution being renewed each time. The granulate was washed free from chloride with distilled water, dried and then activated.

It will be appreciated that the instant specification and examples are set forth by way of illustration and not limitation, and that various modifications and changes may be made without departing from the spirit and scope of the present invention.

What is claimed is:

1. In the process for the production of a granular abrasion resistant binder-free molecular sieve zeolite comprising bonding a powder comprising a faujasite type zeolite with silica gel into larger granules, treating said granules at a temperature of about 15°to 100°C with an aqueous solution containing at least about 0.7 mole of $Al_2O_3$ in the form of aluminate per mole of silica gel binder and NaOH, the improvement which comprises establishing an $H_2O/Na_2O$ molar ratio of about 15 to 60 in said aqueous solution, whereby the silica gel binder within each granule is converted to a type A zeolite.

2. Process according to claim 1, wherein the graunules comprising powder and binder contain about 10 to 25 percent of binder by weight.

3. Process according to claim 1, wherein the bonding of said powder into granules is effected by suspending said powder in a silica sol having an $SiO_2$ content of at least about 10 percent by weight and a specific surface area of about 150 to 400 $m^2/g$ according to BET, mixing the suspension with a suspension of magnesium oxide in water, distributing the gellable mixture in the form of droplets of the desired granular size in a liquid which is immiscible with water and separating the solidified spheres of gel from the liquid.

4. Process according to claim 3, wherein the granules comprising powder and binder contain about 15 to 20 percent of binder by weight.

* * * * *